US012352325B2

(12) United States Patent
Wernette

(10) Patent No.: US 12,352,325 B2
(45) Date of Patent: Jul. 8, 2025

(54) DRUM BRAKE ASSEMBLY

(71) Applicant: ZF Active Safety US Inc., Livonia, MI (US)

(72) Inventor: Matthew Wernette, Livonia, MI (US)

(73) Assignee: ZF ACTIVE SAFETY US INC., Livonia, MI (US)

(*) Notice: Subject to any disclaimer, the term of this patent is extended or adjusted under 35 U.S.C. 154(b) by 382 days.

(21) Appl. No.: 17/859,264

(22) Filed: Jul. 7, 2022

(65) Prior Publication Data
US 2024/0011532 A1    Jan. 11, 2024

(51) Int. Cl.
*F16D 51/20* (2006.01)
*F16D 65/22* (2006.01)
*F16D 65/42* (2006.01)
F16D 51/00 (2006.01)

(52) U.S. Cl.
CPC ............ *F16D 51/20* (2013.01); *F16D 65/22* (2013.01); *F16D 65/42* (2013.01); F16D 2051/003 (2013.01); F16D 2051/005 (2013.01)

(58) Field of Classification Search
None
See application file for complete search history.

(56) References Cited

U.S. PATENT DOCUMENTS

| | | | |
|---|---|---|---|
| 2,164,878 A * | 7/1939 | Main | F16D 65/42 188/79.61 |
| 4,200,174 A | 4/1980 | Baltare et al. | |
| 6,345,708 B1 * | 2/2002 | Fujiwara | F16D 51/20 188/341 |
| 7,490,702 B1 | 2/2009 | Schmandt | |
| 8,011,482 B2 | 9/2011 | Boyle et al. | |
| 9,512,891 B2 | 12/2016 | Berwanger | |
| 11,060,572 B2 | 7/2021 | Barbosa | |

FOREIGN PATENT DOCUMENTS

| | | |
|---|---|---|
| AT | 134343 B | 7/1933 |
| DE | 973850 C | 6/1960 |
| DE | 7400681 U | 10/1975 |

OTHER PUBLICATIONS

DE 7400681U—English Machine Translation (Year: 1975).*
Search report for Germany application No. 102023206193.7, dated Oct. 6, 2024, 8 pages.

* cited by examiner

*Primary Examiner* — Melanie Torres Williams
(74) *Attorney, Agent, or Firm* — Tarolli, Sundheim, Covell & Tummino LLP

(57) ABSTRACT

A drum brake assembly for a vehicle includes a brake drum. First and second brake shoes are displaceable between a rest condition in which the first and second brake shoes are spaced from the brake drum and a braking condition in which the first and second brake shoes engage the brake drum. A first spring applies a force between the first brake shoe and a fixed component of the vehicle. A second spring applies a force between the second brake shoe and the fixed component of the vehicle. The first and second springs biasing the first and second brake shoes to the rest condition.

15 Claims, 3 Drawing Sheets

DRUM BRAKE ASSEMBLY

FIELD OF THE INVENTION

The present invention relates to a drum brake assembly for a vehicle.

BACKGROUND OF THE INVENTION

Vehicles (e.g., motor vehicles) are typically equipped with a brake system for slowing or stopping movement of the vehicle in a controlled manner. A typical brake system for a motor vehicle includes a disc brake assembly for each of the front wheels and a drum brake assembly for each of the rear wheels. The brake assemblies are actuated by hydraulic or pneumatic pressure generated when an operator of the vehicle depresses a brake pedal. The brake assemblies may be used to provide service braking, emergency braking and/or a parking brake function. The structures and operation of these disc brake assemblies and drum brake assemblies are well known in the art.

FIGS. 1-2 depict an example known drum brake assembly 100 from U.S. Pat. No. 11,060,572 to Barbosa, the subject matter of which is incorporated herein by reference. The drum brake assembly 100 includes a drum-in-hat adapter 102 mounted to an axle case 204 so as to be rotationally fixed, a brake drum 212 that rotates with the vehicle wheel and a pair of brake shoes 108a, 108b that are rotationally fixed. The drum brake assembly 100 operates by the brake shoes 108a, 108b being selectively moved between braking and rest conditions. In the braking condition, the brake shoes 108a, 108b contact and press against the brake drum 212 to slow or otherwise stop rotation of the wheel to provide braking for the vehicle. In the rest condition, the brake shoes 108a, 108b do not contact the brake drum 212 and allow the wheel to rotate freely. For the drum brake assembly 100 to provide emergency braking, or to provide the parking brake function, an electric actuator assembly 116 may be used to actuate the brake shoes 108a, 108b from the rest condition to the braking condition and/or to support or otherwise maintain the brake shoes 108a, 108b in the braking condition.

The drum brake assembly 100 includes at least one return spring 120 connected to a first end 118a, 118b of each of the brake shoes 108a, 108b. The return spring 120 applies a force between the brake shoes 108a, 108b that bias the first ends 118a, 118b of the brake shoes 108a, 108b to the rest condition. In the rest condition, the first ends 118a, 118b both engage a shoe anchor 122 that extends from the drum-in-hat adapter 102. The engagement between the first ends 118a, 118b and the shoe anchor 122 helps center the first ends 118a, 118b of the brake shoes 108a, 108b in the brake drum assembly 100 following a braking movement of the brake shoes 108a, 108b so that the first ends 118a, 118b do not undesirably interfere with the rotating brake drum 212. Therefore, the return spring 120 provides a centering function for the first ends 118a, 118b of the brake shoes 108a, 108b by biasing the first ends 118a, 118b to the rest condition and into engagement with the shoe anchor 122.

Second ends 130a, 130b of the brake shoes 108a, 108b also include a return spring 121 that is connected to each brake shoe 108a, 108b and applies a force between the brake shoes 108a, 108b. The return spring 121, however, does not bias the second ends 130a, 130b into engagement with a shoe anchor following a braking movement. The return spring 121 simply urges the second ends 130a, 130b toward one another and, thus, may not center each of the second ends 130a, 130b in the brake drum assembly 100 following a braking movement. An off-center brake shoe 108a, 108b can cause undesirable interference with the rotating drum brake 212 when vehicle braking is not desired (e.g., when the parking brake is not in use).

SUMMARY OF THE INVENTION

According to an aspect of the invention, alone or in combination with any other aspect, a drum brake assembly for a vehicle includes a brake drum. First and second brake shoes are displaceable between a rest condition in which the first and second brake shoes are spaced from the brake drum and a braking condition in which the first and second brake shoes engage the brake drum. A first spring applies a force between the first brake shoe and a fixed component of the vehicle. A second spring applies a force between the second brake shoe and the fixed component of the vehicle. The first and second springs bias the first and second brake shoes to the rest condition.

According to another aspect, alone or in combination with any other aspect, a drum brake assembly for a vehicle includes a drum-in-hat adapter adapted to be secured to a fixed component of the vehicle. The drum-in-hat adapter has a post. First and second brake shoes are displaceable relative to the drum-in-hat adapter. Each of the first and second brake shoes has opposite first and second ends. At least one return spring centers the first ends of the first and second brake shoes following a braking movement of the first and second brake shoes. A first spring centers the second end of the first brake shoe following the braking movement of the first brake shoe. The first spring is connected to the second end of the first brake shoe and the post. A second spring centers the second end of the second brake shoe following the braking movement of the second brake shoe. The second spring is connected to the second end of the second brake shoe and the post.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 3:
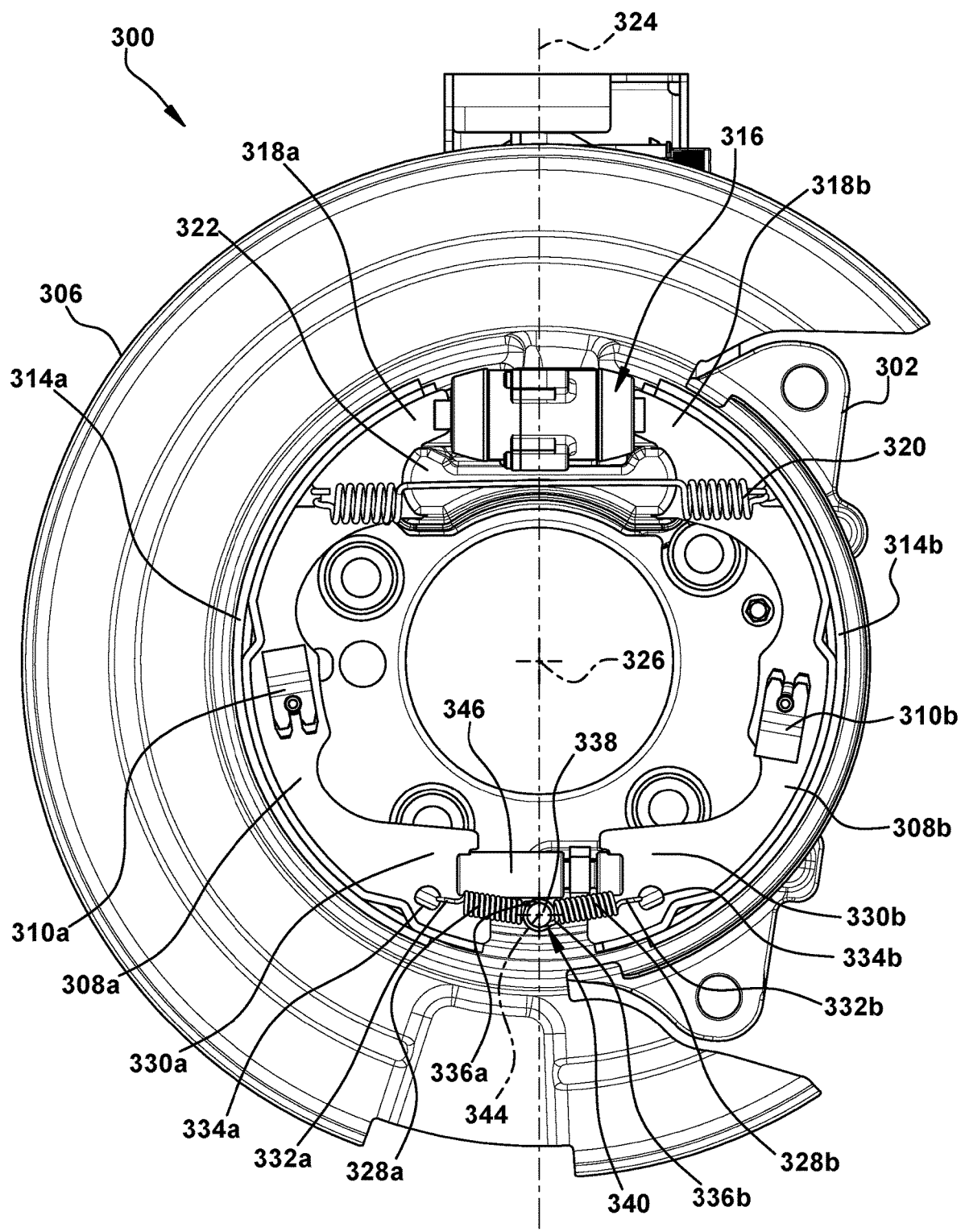
FIG. 3 is a first side perspective view of a drum brake assembly for a vehicle according to the present disclosure.
Figure 4:
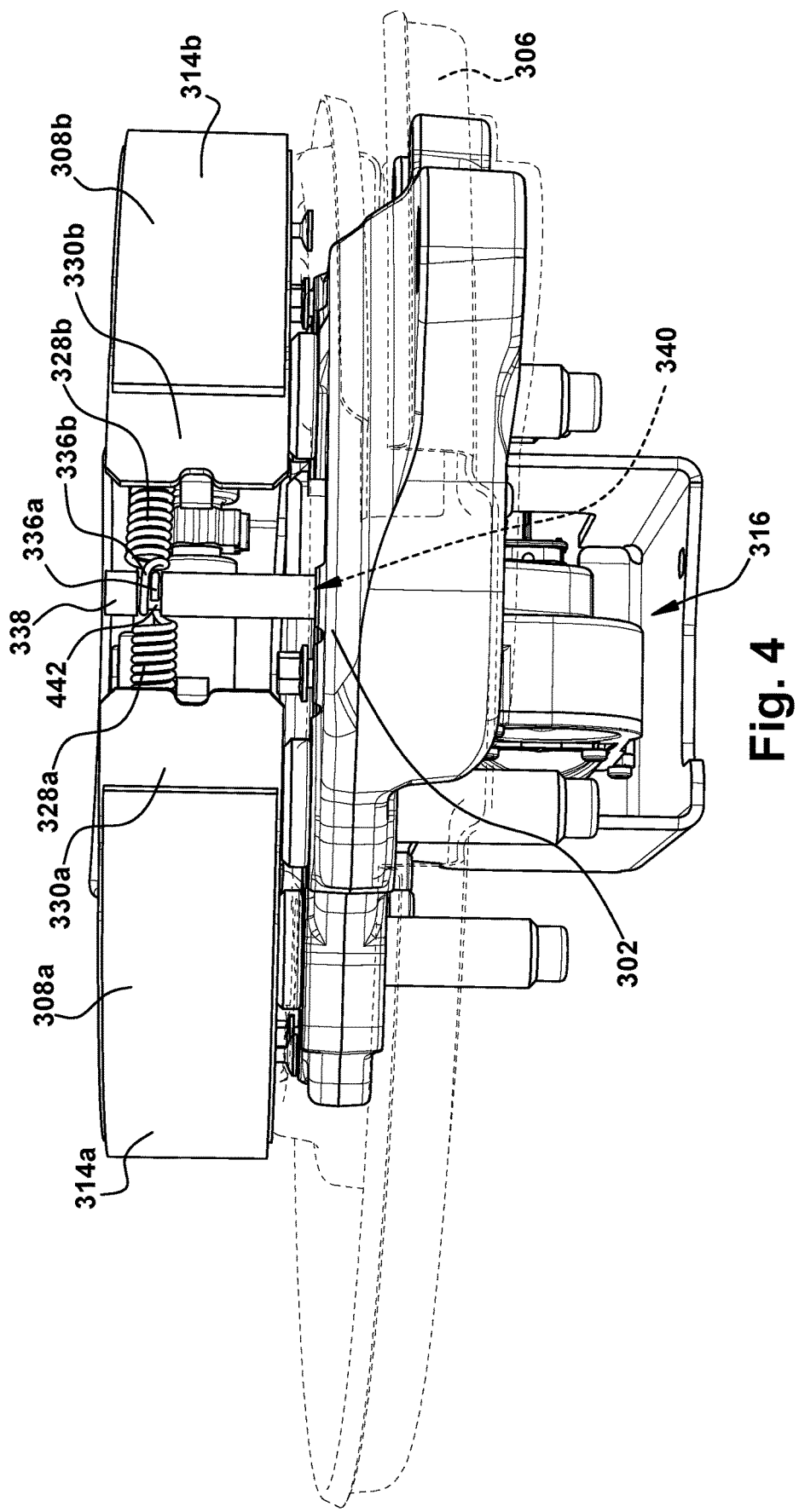
FIG. 4 is a bottom view of the drum brake assembly of FIG. 3.

Referring now to FIGS. 3-4, there is illustrated a drum brake assembly 300 for a vehicle. The general structure and operation of the drum brake assembly 300 is conventional in the art. Thus, only those portions of the drum brake assembly 300 which are necessary for a full understanding of this invention will be explained and illustrated in detail. Also, although this invention will be described and illustrated in connection with the drum brake assembly 300, it will be appreciated that this invention may be used in connection with other vehicle drum brake assemblies, if so desired. As illustrated, the drum brake assembly 300 is a duo-servo type drum brake assembly.

The drum brake assembly 300 is scalable and flexible for usage with vehicles of different sizes and classifications. As non-limiting examples, the drum brake assembly 300 may be scaled for use with different sizes of passenger cars, crossover vehicles, sport utility vehicles, light duty trucks, or heavy duty trucks.

The drum brake assembly 300 has a drum-in-hat adapter 302 for mounting a portion of the drum brake assembly 300 to an axle case (such as to the axle case 204). The drum-in-hat adapter 302, being mounted to an axle case 204, is rotationally fixed in the vehicle. The drum brake assembly 300 also includes a splash shield 306 at least partially overlying the drum-in-hat adapter 302, first and second brake shoes 308a, 308b and first and second shoe hold down clips 310a, 310b. The first and second brake shoes 308a, 308b are selectively displaceable relative to the drum-in-hat adapter 302 between braking and rest conditions. In the braking condition, the brake shoes 308a, 308b contact and press against a brake drum (such as the brake drum 212) to slow or otherwise stop rotation of a wheel to which the brake drum 212 is rotationally fixed. Each of the brake shoes 308a, 308b may include a friction pad or lining 314a, 314b secured thereto for direct frictional engagement with the brake drum 212. In the rest condition (FIG. 3), the brake shoes 308a, 308b do not contact the brake drum 212 and allow the wheel to rotate freely. An actuator assembly 316 (e.g., an electric actuator assembly) may be operably connected to a first end 318a, 318b of each of the brake shoes 308a, 308b for selectively moving the brake shoes 308a, 308b between the rest and braking conditions. For example, the actuator assembly 316 can be actuated to move the brake shoes 308a, 308b from the rest condition to the braking condition when a service braking, emergency braking and/or a parking brake function of the drum brake assembly 300 is desired.

At least one return spring 320 is also connected to the first ends 318a, 318b of the brake shoes 308a, 308b. The return spring 320 applies a force between the brake shoes 308a, 308b that biases the first ends 318a, 318b to the rest condition. In the rest condition, the first ends 318a, 318b both engage a shoe anchor 322 that extends from the drum-in-hat adapter 302. The shoe anchor 322 may be integrally formed with the drum-in-hat adapter 302 as one-piece, or formed separately and then connected to the drum-in-hat adapter 302. The engagement between the first ends 318a, 318b and the shoe anchor 322 helps center the first ends 318a, 318b in the brake drum assembly 300 following a braking movement of the brake shoes 308a, 308b. When centered, the first ends 318a, 318b are each spaced a predetermined distance from a plane 324 on which a longitudinal axis 326 of the drum-in-hat adapter 302 lies. The predetermined distances are selected so that the first ends 318a, 318b do not undesirably interfere with (e.g., by contacting) the rotating brake drum 212 when the service braking, emergency braking and/or a parking brake function of the drum brake assembly 300 is not in use.

First and second springs 328a, 328b are provided at the second ends 330a, 330b of the brake shoes 308a, 308b for centering the second ends 330a, 330b following a braking movement. A first end 332a, 332b of each spring 328a, 328b is connected to the second end 330a, 330b of a respective brake shoe 308a, 308b, such as to a respective aperture 334a, 334b of the respective brake shoe 308a, 308b. A second end 336a, 336b of each spring 328a, 328b is connected to a fixed component 338 of the vehicle so that each spring applies 328a, 328b a force between a respective brake shoe 328a, 328b and the fixed component 338 of the vehicle. In the example configuration shown of FIGS. 3-4, the fixed component 338 is a post that is directly connected to the drum-in-hat adapter 302 and extends through an aperture 340 in the splash shield 306 to a position between the second ends 330a, 330b of the brake shoes 308a, 308b. The post 338 may be formed integrally with the drum-in-hat adapter 302 as one-piece, or may be formed separately from the drum-in-hat adapter 302 and then connected to the drum-in-hat adapter 302 (e.g., by being screwed into the drum-in-hat adapter 302). As shown in FIG. 4, the post 338 may have a circumferentially indented portion 442 to which the second ends 336a, 336b of the first and second springs 328a, 328b are directly connected.

Although the post 338 is shown as being directly connected to and extending from the drum-in-hat adapter 302, the post 338 may instead be directly connected to and extend from the splash shield 306 or any other rotationally fixed component of the vehicle. Further, instead of being connected to the post 338, the second ends 336a, 336b of the springs 328a, 328b may be connected to any other fixed component of the vehicle, such as to, for example, a portion of the drum-in-hat adapter 302, the splash shield 306, or a component connected to or integrally formed with the drum-in-hat adapter 302 and/or splash shield 306.

In the example configuration of FIGS. 3-4, the first and second springs 328a, 328b apply a force between the brake shoes 308a, 308b and the post 338 that biases the second ends 330a, 330b of the brake shoes 308a, 308b to the rest condition. In the rest condition, the second ends 330a, 330b are spaced from the post 338 so as to not make contact with the post 338. A longitudinal axis 344 of the post 338, however, lies on the same plane 324 as the longitudinal axis 326 of the drum-in-hat adapter 302. Each spring 328a, 328b thus urges the second end 330a, 330b of their respective brake shoe 308a, 308b toward the plane 324 to center the respective brake shoe 308a, 308b following a braking movement. When centered, the second ends 330a, 330b are each spaced a predetermined distance from the plane 324. The predetermined distances are selected so that the second ends 330a, 330b do not undesirably interfere with the rotating brake drum 212 when the service braking, emergency braking and/or a parking brake function of the drum brake assembly 300 is not in use. Therefore, the springs 328a, 328b prevent the second ends 330a, 330b of the brake shoes 308a, 308b from contacting the brake drum 212 when it is undesirable for the second ends 330a, 330b to contact the brake drum 212.

Figure 1:
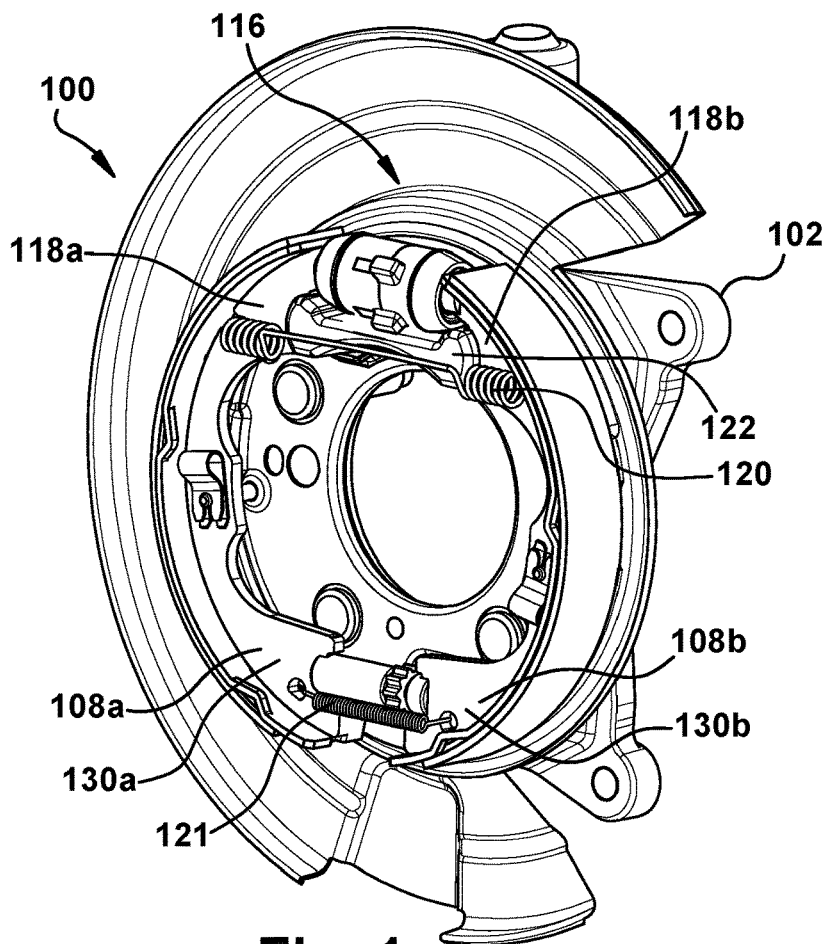
FIG. 1 is a first side perspective view of a prior art drum brake assembly for a vehicle.
Figure 2:
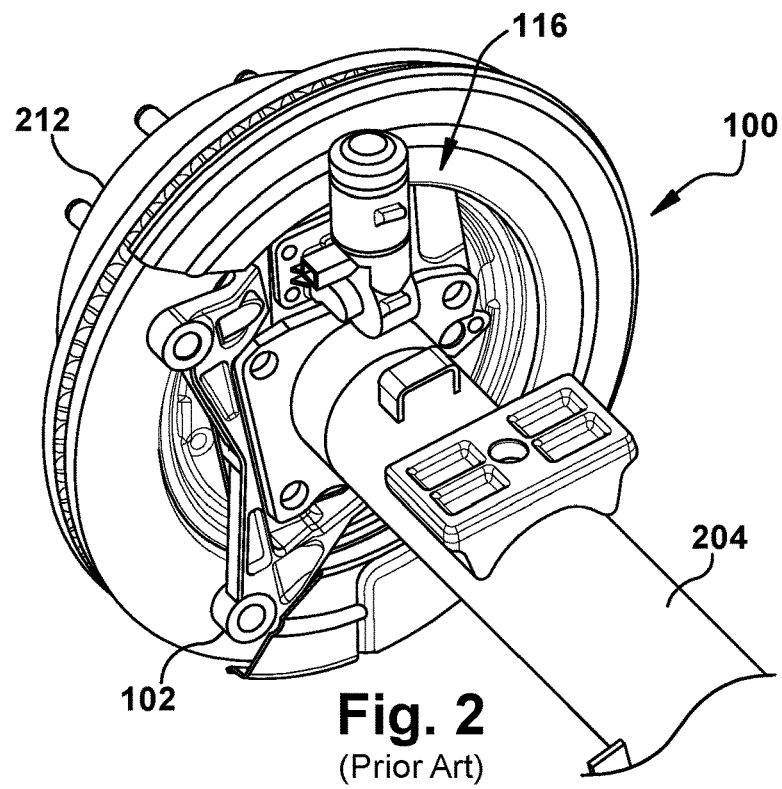
FIG. 2 is a second side perspective view of the prior art drum brake assembly of FIG. 1.

Unlike the return spring 121 of FIG. 1, the first and second springs 328a, 328b are not directly connected to each brake shoe 308a, 308b. Therefore, instead of simply pulling the brake shoes 308a, 308b together like the return spring 121, the first and second springs 328a, 328b center the second ends 330a, 330b of the brake shoes 308a, 308b in the drum brake assembly 300 following a braking movement. The first and second springs 328a, 328b also do not apply a force (e.g., directly apply a force) to their opposing brake shoe 308a, 308b because of their lack of connection to the opposing brake shoe 308a, 308b. Each spring 328a, 328b thus individually urges the second end 330a, 330b of their respective brake shoe 308a, 308b toward the rest position and the plane 324 to center their respective brake shoe 308a, 308b without interfering with their opposing brake shoe 308a, 308b.

As shown in FIGS. 3-4, the brake drum assembly 300 may also include a manual shoe adjusting mechanism 346 operably connected to the second end 330a, 330b of each brake shoe 308a, 308b. The manual shoe adjusting mechanism 346 compensates for thinning of the brake shoes 308a, 308b and/or the friction pads or linings 314a, 314b resulting from wear caused by repeated use.

From the above description of the invention, those skilled in the art will perceive improvements, changes and modifications. Such improvements, changes and modifications within the skill of the art are intended to be covered by the appended claims.

Having described the invention, the following is claimed:

1. A drum brake assembly for a vehicle, comprising:
a brake drum;
first and second brake shoes displaceable between a rest condition in which the first and second brake shoes are spaced from the brake drum and a braking condition in which the first and second brake shoes engage the brake drum;
a first spring applying a force between the first brake shoe and a fixed component of the vehicle;
a second spring applying a force between the second brake shoe and the fixed component of the vehicle, the first and second springs biasing the first and second brake shoes to the rest condition, wherein the fixed component is a post that is between the first and second brake shoes; and
a drum-in-hat adapter adapted to secure a portion of the drum brake assembly to an axle case of the vehicle, the post extending from the drum-in-hat adapter, a longitudinal axis of the post and a longitudinal axis of the drum-in-hat adapter lying in a plane, the first spring urging the first brake shoe towards the plane and the rest condition.

2. The drum brake assembly recited in claim 1, wherein the first and second brake shoes have opposite first and second ends, the first ends being biased to the rest condition by at least one return spring, the first and second springs biasing the second ends of the first and second brake shoes to the rest condition.

3. The drum brake assembly recited in claim 2, wherein the first ends of the first and second brake shoes engage a shoe anchor in the rest condition.

4. The drum brake assembly recited in claim 2, further comprising a manual brake shoe adjusting mechanism operably connected to the second ends of the first and second brake shoes.

5. The drum brake assembly recited in claim 2, further comprising an actuator adjacent the first ends of the first and second brake shoes for moving the first and second brake shoes from the rest condition to the braking condition.

6. The drum brake assembly recited in claim 1, wherein the first brake shoe is prevented from contacting the brake drum by the first spring when a parking brake of the vehicle is not in use.

7. The drum brake assembly recited in claim 1, wherein the first spring does not apply a force directly to the second brake shoe and the second spring does not apply a force directly to the first brake shoe.

8. The drum brake assembly recited in claim 1, wherein the first spring has a first end connected to the first brake shoe and a second end connected to the post, the second spring having a first end connected to the second brake shoe and a second end connected to the post.

9. The drum brake assembly recited in claim 8, wherein the second ends of the first and second springs are directly connected to the post.

10. The drum brake assembly recited in claim 1, wherein the second spring urges the second brake shoe towards the plane and the rest condition.

11. The drum brake assembly recited in claim 1, wherein the first brake shoe is spaced from the post in the rest condition.

12. The drum brake assembly recited in claim 1, further comprising:
a shield at least partially overlying the drum-in-hat adapter, the post being directly connected to one of the shield and the drum-in-hat adapter.

13. The drum brake assembly recited in claim 12, wherein the post is directly connected to and extends from the drum-in-hat adapter.

14. The drum brake assembly recited in claim 13, wherein the post extends through an opening in the shield.

15. The drum brake assembly recited in claim 1, wherein the drum brake assembly is a duo-servo drum brake assembly.

* * * * *